(12) United States Patent
Isogawa et al.

(10) Patent No.: US 9,061,183 B2
(45) Date of Patent: Jun. 23, 2015

(54) GOLF BALL

(75) Inventors: Kazuhiko Isogawa, Kobe (JP); Seiichiro Endo, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 656 days.

(21) Appl. No.: 13/048,915

(22) Filed: Mar. 16, 2011

(65) Prior Publication Data

US 2011/0250991 A1    Oct. 13, 2011

(30) Foreign Application Priority Data

Apr. 7, 2010   (JP) ................................ 2010-088313

(51) Int. Cl.
| | |
|---|---|
| *A63B 37/06* | (2006.01) |
| *A63B 37/00* | (2006.01) |
| *C08K 5/00* | (2006.01) |
| *C08K 5/37* | (2006.01) |

(52) U.S. Cl.
CPC ............ *A63B 37/0074* (2013.01); *C08K 5/0025* (2013.01); *C08K 5/37* (2013.01); *A63B 37/0003* (2013.01); *A63B 37/0062* (2013.01); *A63B 37/0063* (2013.01); *A63B 37/0096* (2013.01); *A63B 37/06* (2013.01)

(58) Field of Classification Search
CPC ............ A63B 37/0063; A63B 37/0074; A63B 37/0062; C08K 5/0025; C08K 5/37
See application file for complete search history.

(56) References Cited

U.S. PATENT DOCUMENTS

| | | | | |
|---|---|---|---|---|
| 4,069,259 A | * | 1/1978 | Cipris et al. .................... | 568/24 |
| 4,570,937 A | * | 2/1986 | Yamada ....................... | 473/377 |
| 5,072,944 A | * | 12/1991 | Nakahara et al. ............. | 473/373 |
| 5,403,010 A | * | 4/1995 | Yabuki et al. ................. | 473/372 |
| 5,516,110 A | * | 5/1996 | Yabuki et al. ................. | 473/372 |
| 5,562,287 A | | 10/1996 | Endo et al. | |
| 5,803,833 A | * | 9/1998 | Nakamura et al. ............ | 473/377 |
| 6,755,754 B2 | * | 6/2004 | Kato et al. .................... | 473/374 |
| 7,273,425 B2 | * | 9/2007 | Higuchi ........................ | 473/377 |
| 7,481,722 B2 | * | 1/2009 | Higuchi ........................ | 473/377 |

(Continued)

FOREIGN PATENT DOCUMENTS

| | | |
|---|---|---|
| JP | 2-264674 A | 10/1990 |
| JP | 6-98949 A | 4/1994 |

(Continued)

*Primary Examiner* — John E Simms, Jr.
(74) *Attorney, Agent, or Firm* — Birch, Stewart, Kolasch & Birch, LLP

(57) ABSTRACT

A golf ball 2 includes a spherical core 4 and a cover 6 positioned outside the core 4. The core 4 is obtained by crosslinking a rubber composition including 2-naphthalenethiol. The difference between: a hardness H(5.0) at a point which is located at a distance of 5 mm from the central point of the core 4; and a hardness Ho at the central point is 6.0 or greater. The difference between: a hardness H(12.5) at a point which is located at a distance of 12.5 mm from the central point; and the hardness H(5.0) is 4.0 or less. The difference between a hardness Hs at the surface of the core 4 and the hardness H(12.5) is 10.0 or greater. The difference between the hardness Hs and the hardness Ho is 22.0 or greater. There is no zone in which a hardness decreases from the central point to the surface.

8 Claims, 14 Drawing Sheets

(56) References Cited

U.S. PATENT DOCUMENTS

| | | |
|---|---|---|
| 2002/0019269 A1* | 2/2002 | Watanabe ............. 473/370 |
| 2002/0032077 A1* | 3/2002 | Watanabe ............. 473/370 |
| 2003/0032501 A1 | 2/2003 | Sakagami et al. |
| 2005/0075196 A1* | 4/2005 | Shimizu et al. ......... 473/371 |
| 2006/0178231 A1 | 8/2006 | Kasashima |
| 2008/0020863 A1* | 1/2008 | Higuchi et al. ......... 473/370 |
| 2008/0194357 A1* | 8/2008 | Higuchi ............... 473/373 |
| 2008/0312008 A1* | 12/2008 | Higuchi et al. ......... 473/372 |
| 2009/0312121 A1* | 12/2009 | Isogawa et al. ......... 473/374 |
| 2010/0173726 A1* | 7/2010 | Sullivan et al. ......... 473/372 |

FOREIGN PATENT DOCUMENTS

| | | |
|---|---|---|
| JP | 6-154357 A | 6/1994 |
| JP | 7-112036 A | 5/1995 |
| JP | 2002-764 A | 1/2002 |
| JP | 2002-765 A | 1/2002 |
| JP | 2003-33447 A | 2/2003 |
| JP | 2003-320056 A | 11/2003 |
| JP | 2006-218294 A | 8/2006 |
| JP | 2008-194473 A | 8/2008 |
| JP | 2010-22504 A | 2/2010 |

* cited by examiner

US 9,061,183 B2

GOLF BALL

This application claims priority on Patent Application No. 2010-88313 filed in JAPAN on Apr. 7, 2010. The entire contents of this Japanese Patent Application are hereby incorporated by reference.

BACKGROUND OF THE INVENTION

1. Field of the Invention

The present invention relates to golf balls. Specifically, the present invention relates to golf balls including a solid core and a cover.

2. Description of the Related Art

Golf players' foremost requirement for golf balls is flight performance. Golf players place importance on flight performance upon shots with a driver, a long iron, and a middle iron. Flight performance correlates with the resilience performance of a golf ball. When a golf ball with excellent resilience performance is hit, the golf ball flies at a high speed, thereby achieving a large flight distance.

An appropriate trajectory height is required in order to achieve a large flight distance. A trajectory height depends on a spin rate and a launch angle. In a golf ball which achieves a high trajectory by a high spin rate, a flight distance is insufficient. In a golf ball which achieves a high trajectory by a high launch angle, a large flight distance is obtained. By using a core having an outer-hard/inner-soft structure, a low spin rate and a high launch angle can be achieved.

JPH2-264674 (U.S. Pat. No. 5,072,944) discloses a golf ball with a core consisting of a center and an outer layer. The center is flexible, and the outer layer is hard. The core suppresses a spin rate.

However, in the golf ball disclosed in JPH2-264674, the structure of the core is complicated. The core produces an energy loss when being hit. In addition, the core has inferior durability.

JPH6-98949 (U.S. Pat. No. 5,516,110) discloses a golf ball having a constant hardness between: a point which is located at a distant of 5 mm from a central point; and a point which is located at a distant of 10 mm from the central point. A similar golf ball is also disclosed in JPH6-154357 (U.S. Pat. No. 5,403,010).

However, in the golf ball disclosed in JPH6-98949, a range where the hardness is constant is narrow. The golf ball has inferior resilience performance. Similarly, the golf ball disclosed in JPH6-154357 also has inferior resilience performance.

JPH7-112036 (U.S. Pat. No. 5,562,287) discloses a golf ball having a small difference between a central hardness and a surface hardness of a core. The core contributes to the resilience performance of the golf ball.

However, in the golf ball disclosed in JPH7-112036, a spin rate is excessive. The golf ball has a small flight distance.

JP2002-764 (US2002/032077) discloses a golf ball having a great difference between a central hardness and a surface hardness of a core. A similar golf ball is also disclosed in JP2002-765 (US2002/019269).

However, the golfball disclosed in JP2002-764 has inferior resilience performance. Similarly, the golf ball disclosed in JP2002-765 also has inferior resilience performance.

JP2003-33447 (US2003/032501) discloses a golf ball with a core for which a rubber composition includes a polysulfide. The polysulfide contributes to the resilience performance of the golf ball.

However, in the golf ball disclosed in JP2003-33447, a spin rate is excessive. The golf ball has inferior flight performance.

JP2008-194473 (US2008/194357 and US2008/312008) discloses a golf ball having a great difference between a central hardness and a surface hardness of a core. A similar golf ball is also disclosed in JP2010-22504.

However, in the golfball disclosed in JP2008-194473, there is a zone in which a hardness decreases from the central point of the core toward the surface of the core. The golf ball has inferior resilience performance. In the golf ball, a spin rate is excessive. The golf ball has inferior flight performance. Similarly, the golf ball disclosed in JP2010-22504 also has inferior flight performance.

An object of the present invention is to provide a golf ball having excellent flight performance.

SUMMARY OF THE INVENTION

A golf ball according to the present invention comprises a core and a cover positioned outside the core. A difference between: a JIS-C hardness $H(5.0)$ at a point which is located at a distance of 5 mm from a central point of the core; and a JIS-C hardness $H_o$ at the central point is equal to or greater than 6.0. A difference between: a JIS-C hardness $H(12.5)$ at a point which is located at a distance of 12.5 mm from the central point; and the hardness $H(5.0)$ is equal to or less than 4.0. A difference between a JIS-C hardness $H_s$ at a surface of the core and the hardness $H(12.5)$ is equal to or greater than 10.0. A difference between the hardness $H_s$ and the hardness $H_o$ is equal to or greater than 22.0.

Preferably, the core is formed by crosslinking a rubber composition including a base rubber and an organic sulfur compound. The organic sulfur compound has a molecular weight of 150 or higher but 200 or lower and a melting point of 65° C. or higher but 90° C. or lower. Preferably, the rubber composition includes the base rubber in an amount of 100 parts by weight, and the organic sulfur compound in an amount which is equal to or greater than 0.03 parts by weight but equal to or less than 3.5 parts by weight. Preferably, the organic sulfur compound is 2-naphthalenethiol.

Preferably, the hardness $H_o$ is equal to or greater than 40.0 but equal to or less than 70.0, and the hardness $H_s$ is equal to or greater than 78.0 but equal to or less than 95.0.

Preferably, the hardness $H(5.0)$ is equal to or greater than 63.0 but equal to or less than 73.0.

Preferably, the hardness $H(12.5)$ is equal to or greater than 64.0 but equal to or less than 76.0.

Preferably, an amount of compressive deformation CD of the golf ball is equal to or greater than 2.5 mm but equal to or less than 4.0 mm.

In the golf ball according to the present invention, a hardness distribution of the core is appropriate. The core has a low energy loss when being hit. The golf ball has excellent resilience performance. When the golf ball is hit with a driver, a spin rate is low. The great resilience performance and the low spin rate achieve a large flight distance.

DESCRIPTION OF THE PREFERRED EMBODIMENTS

The following will describe in detail the present invention based on preferred embodiments with reference to the accompanying drawings.

Figure 1:
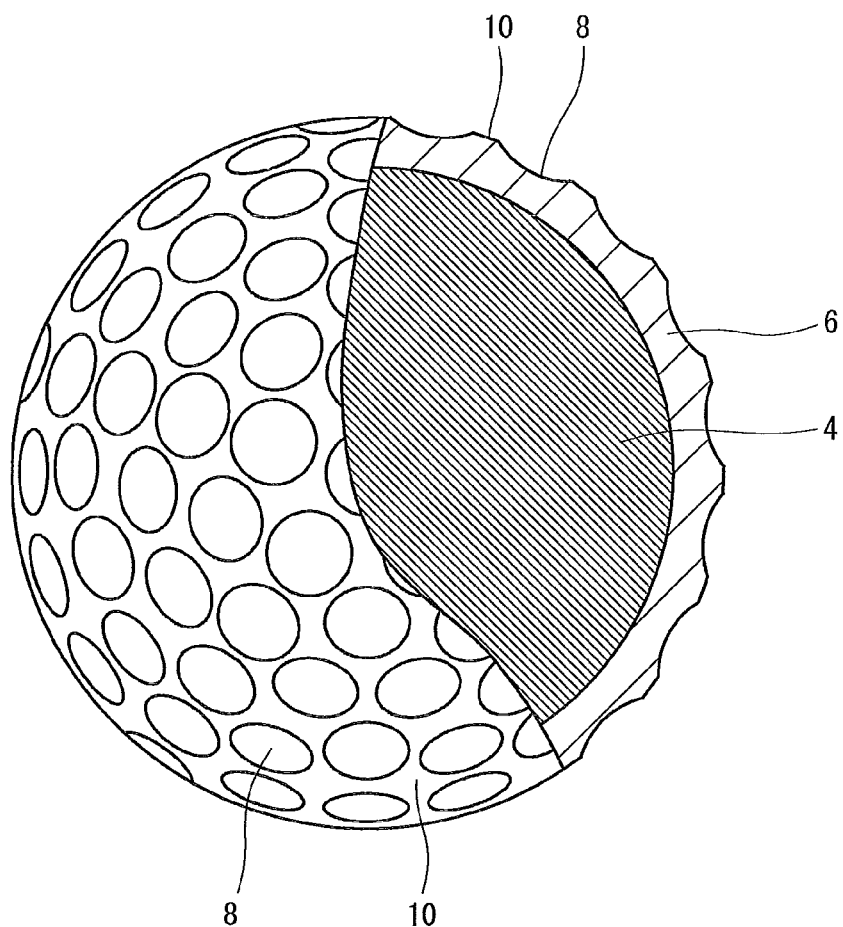
FIG. 1 is a partially cutaway cross-sectional view of a golf ball according to one embodiment of the present invention.

A golf ball 2 shown in FIG. 1 includes a spherical core 4 and a cover 6 positioned outside the core 4. On the surface of the cover 6, a large number of dimples 8 are formed. Of the surface of the golf ball 2, a part other than the dimples 8 is a land 10. The golf ball 2 includes a paint layer and a mark layer on the external side of the cover 6 although these layers are not shown in the drawing.

The golf ball 2 has a diameter of 40 mm or greater but 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater but 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

In the present invention, a JIS-C hardness at a point which is located at a distance of x (mm) from the central point of the core 4 is indicated by H(x). In the present invention, a hardness at the central point of the core 4 is indicated by Ho, and a surface hardness of the core 4 is indicated by Hs.

The hardness Ho and the hardness H(x) are measured by pressing a JIS-C type hardness scale against a cut plane of the core 4 which has been cut into two halves. For the measurement, an automated rubber hardness measurement machine (trade name "P1", manufactured by Kobunshi Keiki Co., Ltd.), to which this hardness scale is mounted, is used. The surface hardness Hs is measured by pressing a JIS-C type hardness scale against the surface of the core 4. For the measurement, an automated rubber hardness measurement machine (trade name "P1", manufactured by Kobunshi Keiki Co., Ltd.), to which this hardness scale is mounted, is used.

Figure 2:
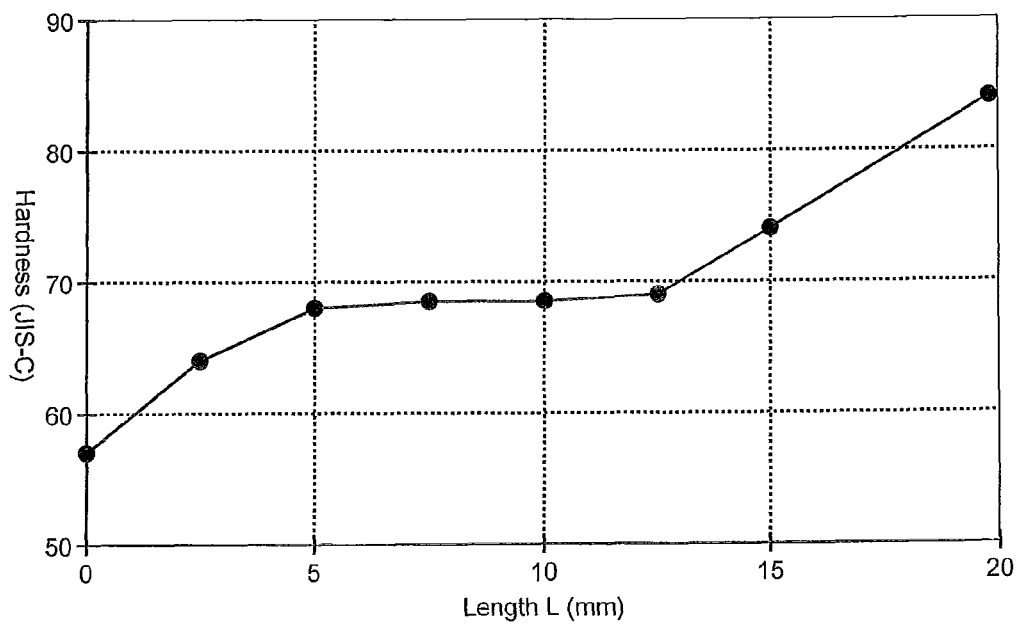
FIG. 2 is a graph showing a hardness distribution of a core of the golf ball in FIG. 1.

FIG. 2 shows a hardness distribution of the core 4. In this embodiment, the core 4 has a diameter of 39.6 mm. Thus, in FIG. 2, a hardness at a point which is located at a distance of 19.8 mm from the central point is the hardness Hs at the surface. As is obvious from FIG. 2, in the core 4, there is no zone in which the hardness decreases from the central point toward the surface. The core 4 has an outer-hard/inner-soft structure. The core 4 has a low energy loss when being hit. The core 4 has excellent resilience performance. In the core 4, spin is suppressed. The core 4 contributes to the flight performance of the golf ball 2.

As shown in FIG. 2, in this embodiment, a hardness H(5.0) is 68.0, and the hardness Ho is 57.0. The difference (H(5.0)–Ho) between the hardness H(5.0) and the hardness Ho is 11.0. The difference (H(5.0)–Ho) is great. In the golf ball 2 in which the difference (H(5.0)–Ho) is great, a spin rate is low when the golf ball 2 is hit with a driver. The low spin rate can achieve a large flight distance. In light of suppression of spin, the difference (H(5.0)–Ho) is preferably equal to or greater than 6.0 and particularly preferably equal to or greater than 8.0. In light of ease of producing the core 4, the difference (H(5.0)–Ho) is preferably equal to or less than 15.0.

As shown in FIG. 2, in this embodiment, a hardness H(12.5) is 69.0, and the hardness H(5.0) is 68.0. The difference (H(12.5)–H(5.0)) between the hardness H(12.5) and the hardness H(5.0) is 1.0. The difference (H(12.5)–H(5.0)) is small. In the core 4, the hardness distribution curve is almost flat between: a point which is located at a distance of 5.0 mm from the central point; and a point which is located at a distance of 12.5 mm from the central point. In the golf ball 2 in which the difference (H(12.5)–H(5.0)) is small, an energy loss is low when the golf ball 2 is hit with the driver. The golf ball 2 has excellent resilience performance. In light of resilience performance, the difference (H(12.5)–H(5.0)) is preferably equal to or greater than 0.0 but equal to or less than 4.0, more preferably equal to or greater than 0.5 but equal to or less than 3.0, and particularly preferably equal to or greater than 0.5 but equal to or less than 1.5.

As shown in FIG. 2, in this embodiment, the hardness Hs is 84.0, and the hardness H(12.5) is 69.0. The difference (Hs–H(12.5)) between the hardness Hs and the hardness H(12.5) is 15.0. The difference (Hs–H(12.5)) is great. In the golf ball 2 in which the difference (Hs–H(12.5)) is great, a spin rate is low when the golf ball 2 is hit with the driver. The low spin rate can achieve a large flight distance. In light of suppression of spin, the difference (Hs–H(12.5)) is preferably equal or greater than 10.0, more preferably equal to or greater than 13.0, and particularly preferably equal to or greater than 14.0. In light of ease of producing the core 4, the difference (Hs–H(12.5)) is preferably equal to or less than 20.0.

As described above, in this embodiment, the hardness Ho is 57.0, and the hardness Hs is 84.0. The difference (Hs–Ho) between the hardness Hs and the hardness Ho is 27.0. The difference (Hs–Ho) is great. In the golf ball 2 in which the difference (Hs–Ho) is great, a spin rate is low when the golf ball 2 is hit with the driver. The low spin rate can achieve a large flight distance. In light of suppression of spin, the difference (Hs–Ho) is preferably equal to or greater than 22.0 and particularly preferably equal to or greater than 24.0. In light of ease of producing the core 4, the difference (Hs–Ho) is preferably equal to or less than 35.0.

The hardness Ho at the central point is preferably equal to or greater than 40.0 but equal to or less than 70.0. The golf ball 2 in which the hardness Ho is equal to or greater than 40.0 has excellent resilience performance. In this respect, the hardness Ho is more preferably equal to or greater than 50.0 and particularly preferably equal to or greater than 55.0. The core 4 in which the hardness Ho is equal to or less than 70.0 can achieve an outer-hard/inner-soft structure. In the golf ball 2 with this core 4, spin can be suppressed. In this respect, the hardness Ho is more preferably equal to or less than 65.0 and particularly preferably equal to or less than 60.0.

The hardness H(5.0) is preferably equal to or greater than 63.0 but equal to or less than 73.0. The golf ball 2 in which the hardness H (5.0) is equal to or greater than 63.0 has excellent resilience performance. In this respect, the hardness H(5.0) is particularly preferably equal to or greater than 65.0. The golf ball 2 in which the hardness H(5.0) is equal to or less than 73.0 provides excellent feel at impact. In this respect, the hardness H(5.0) is particularly preferably equal to or less than 71.0.

The hardness H(12.5) is preferably equal to or greater than 64.0 but equal to or less than 76.0. The golf ball 2 in which the hardness H(12.5) is equal to or greater than 64.0 has excellent resilience performance. In this respect, the hardness H(12.5) is particularly preferably equal to or greater than 66.0. The golf ball 2 in which the hardness H(12.5) is equal to or less than 76.0 provides excellent feel at impact. In this respect, the hardness H(12.5) is particularly preferably equal to or less than 72.0.

The hardness Hs at the surface of the core 4 is preferably equal to or greater than 78.0 but equal to or less than 95.0. The core 4 in which the hardness Hs is equal to or greater than 78.0 can achieve an outer-hard/inner-soft structure. In the golf ball 2 with this core 4, spin can be suppressed. In this respect, the hardness Hs is more preferably equal to or greater than 80.0 and particularly preferably equal to or greater than 82.0. The golf ball 2 in which the hardness Hs is equal to or less than 95.0 has excellent durability. In this respect, the hardness Hs is more preferably equal to or less than 90.0 and particularly preferably equal to or less than 85.0.

The core 4 is obtained by crosslinking a rubber composition. Examples of base rubbers for use in the rubber composition of the core 4 include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred if the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% and more preferably equal to or greater than 80%.

The rubber composition of the core 4 includes a co-crosslinking agent. The co-crosslinking agent achieves high resilience of the core 4. Examples of preferable co-crosslinking agents in light of resilience performance include monovalent or bivalent metal salts of an α,β-unsaturated carboxylic acid having 2 to 8 carbon atoms. Specific examples of preferable co-crosslinking agents include zinc acrylate, magnesium acrylate, zinc methacrylate, and magnesium methacrylate. In light of resilience performance, zinc acrylate and zinc methacrylate are particularly preferred.

In light of resilience performance of the golf ball 2, the amount of the co-crosslinking agent is preferably equal to or greater than 10 parts by weight, and more preferably equal to or greater than 25 parts by weight, per 100 parts by weight of the base rubber. In light of soft feel at impact, the amount of the co-crosslinking agent is preferably equal to or less than 50 parts by weight, and particularly preferably equal to or less than 45 parts by weight, per 100 parts by weight of the base rubber.

Preferably, the rubber composition of the core 4 includes an organic peroxide. The organic peroxide serves as a crosslinking initiator. The organic peroxide contributes to the resilience performance of the golf ball 2. Examples of suitable organic peroxides include dicumyl peroxide, 1,1-bis (t-butylperoxy)-3,3,5-trimethylcyclohexane, 2,5-dimethyl-2, 5-di(t-butylperoxy)hexane, and di-t-butyl peroxide. In light of versatility, dicumyl peroxide is preferred.

In light of resilience performance of the golf ball 2, the amount of the organic peroxide is preferably equal to or greater than 0.1 parts by weight, more preferably equal to or greater than 0.2 parts by weight, and particularly preferably equal to or greater than 0.3 parts by weight, per 100 parts by weight of the base rubber. In light of soft feel at impact, the amount of the organic peroxide is preferably equal to or less than 2.0 parts by weight, more preferably equal to or less than 1.5 parts by weight, and particularly preferably equal to or less than 1.0 parts by weight, per 100 parts by weight of the base rubber.

Preferably, the rubber composition of the core 4 includes an organic sulfur compound. In light of achievement of both excellent resilience performance and a low spin rate, the organic sulfur compound having a molecular weight of 150 or higher but 200 or lower is preferred. The molecular weight is particularly preferably equal to or higher than 155. The molecular weight is particularly preferably equal to or lower than 170.

In light of achievement of both excellent resilience performance and a low spin rate, the organic sulfur compound having a melting point of 65° C. or higher but 90° C. or lower. The melting point is particularly preferably equal to or higher than 75° C. The melting point is particularly preferably equal to or lower than 85° C.

The organic sulfur compounds include naphthalenethiol type compounds, benzenethiol type compounds, and disulfide type compounds.

Examples of naphthalenethiol type compounds includes 1-naphthalenethiol, 2-naphthalenethiol, 4-chloro-1-naphthalenethiol, 4-bromo-1-naphthalenethiol, 1-chloro-2-naphthalenethiol, 1-bromo-2-naphthalenethiol, 1-fluoro-2-naphthalenethiol, 1-cyano-2-naphthalenethiol, and 1-acetyl-2-naphthalenethiol.

Examples of benzenethiol type compounds include benzenethiol, 4-chlorobenzenethiol, 3-chlorobenzenethiol, 4-bromobenzenethiol, 3-bromobenzenethiol, 4-fluorobenzenethiol, 4-iodobenzenethiol, 2,5-dichlorobenzenethiol, 3,5-dichlorobenzenethiol, 2,6-dichlorobenzenethiol, 2,5-dibromobenzenethiol, 3,5-dibromobenzenethiol, 2-chloro-5-bromobenzenethiol, 2,4,6-trichlorobenzenethiol, 2,3,4,5,6-pentachlorobenzenethiol, 2,3,4,5,6-pentafluorobenzenethiol, 4-cyanobenzenethiol, 2-cyanobenzenethiol, 4-nitrobenzenethiol, and 2-nitrobenzenethiol.

Examples of disulfide type compounds include diphenyl disulfide, bis(4-chlorophenyl)disulfide, bis(3-chlorophenyl) disulfide, bis(4-bromophenyl)disulfide, bis(3-bromophenyl) disulfide, bis(4-fluorophenyl)disulfide, bis(4-iodophenyl) disulfide, bis(4-cyanophenyl)disulfide, bis(2,5-dichlorophenyl)disulfide, bis(3,5-dichlorophenyl)disulfide, bis(2,6-dichlorophenyl)disulfide, bis(2,5-dibromophenyl) disulfide, bis(3,5-dibromophenyl)disulfide, bis(2-chloro-5-bromophenyl)disulfide, bis(2-cyano-5-bromophenyl)disulfide, bis(2,4,6-trichlorophenyl)disulfide, bis(2-cyano-4-chloro-6-bromophenyl)disulfide, bis(2,3,5,6-tetrachlorophenyl)disulfide, bis(2,3,4,5,6-pentachlorophenyl)disulfide, and bis(2,3,4,5,6-pentabromophenyl)disulfide.

From the standpoint that the core 4 having an appropriate hardness distribution is obtained, particularly preferable organic sulfur compounds are 1-naphthalenethiol and 2-naphthalenethiol. The molecular weight of each of 1-naphthalenethiol and 2-naphthalenethiol is 160.2. The melting point of 2-naphthalenethiol is 79° C. to 81° C.

The most preferable organic sulfur compound is 2-naphthalenethiol. The chemical formula of 2-naphthalenethiol is shown below.

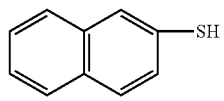 [SMILES: Sc1ccc2ccccc2c1]

From the standpoint that the core 4 having the appropriate hardness distribution is obtained, the amount of the organic sulfur compound is preferably equal to or greater than 0.03 parts by weight, more preferably equal to or greater than 0.05 parts by weight, and particularly preferably equal to or greater than 0.08 parts by weight, per 100 parts by weight of the base rubber. In light of resilience performance, the amount of the organic sulfur compound is preferably equal to or less than 5.0 parts by weight, more preferably equal to or less than 3.5 parts by weight, and particularly preferably equal to or less than 3.0 parts by weight, per 100 parts by weight of the base rubber.

For the purpose of adjusting specific gravity and the like, a filler may be included in the core 4. Examples of suitable fillers include zinc oxide, barium sulfate, calcium carbonate, and magnesium carbonate. The amount of the filler is determined as appropriate so that the intended specific gravity of the core 4 is accomplished. A particularly preferable filler is zinc oxide. Zinc oxide serves not only as a specific gravity adjuster but also as a crosslinking activator.

According to need, an anti-aging agent, a coloring agent, a plasticizer, a dispersant, sulfur, an vulcanization accelerator, and the like are added to the rubber composition of the core 4. Crosslinked rubber powder or synthetic resin powder may be also dispersed in the rubber composition.

The core 4 has a diameter of preferably 34 mm or greater but 42 mm or less. The core 4 having a diameter of 34 mm or greater can achieve excellent resilience performance of the golf ball 2. In this respect, the diameter is more preferably equal to or greater than 36 mm and particularly preferably equal to or greater than 38 mm. In the golf ball 2 with the core 4 having a diameter of 42 mm or less, the cover 6 can have a sufficient thickness. The golf ball 2 with the cover 6 having a large thickness has excellent durability. In this respect, the diameter is more preferably equal to or less than 41 mm and particularly preferably equal to or less than 40 mm.

A resin composition is suitably used for the cover 6. Examples of the base polymer of the resin composition include ionomer resins, styrene block-containing thermoplastic elastomers, thermoplastic polyester elastomers, thermoplastic polyamide elastomers, and thermoplastic polyolefin elastomers.

Particularly preferable base polymers are ionomer resins. The golf ball 2 with the cover 6 including an ionomer resin has excellent resilience performance. An ionomer resin and another resin may be used in combination for the cover 6. In this case, the principal component of the base polymer is preferably the ionomer resin. Specifically, the proportion of the ionomer resin to the entire base polymer is preferably equal to or greater than 50% by weight, more preferably equal to or greater than 70% by weight, and particularly preferably equal to or greater than 80% by weight.

Examples of preferable ionomer resins include binary copolymers formed with an α-olefin and an α,β-unsaturated carboxylic acid having 3 to 8 carbon atoms. A preferable binary copolymer includes 80% by weight or more and 90% by weight or less of an α-olefin, and 10% by weight or more and 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more and 85% by weight or less of an α-olefin, 5% by weight or more and 30% by weight or less of an α,β-unsaturated carboxylic acid, and 1% by weight or more and 25% by weight or less of an α,β-unsaturated carboxylate ester. The ternary copolymer has excellent resilience performance. For the binary copolymer and the ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan AM7329", "Himilan MK7320", and "Himilan MK7329", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation.

Two or more types of ionomer resins may be used in combination for the cover 6. An ionomer resin neutralized with a monovalent metal ion, and an ionomer resin neutralized with a bivalent metal ion may be used in combination.

A preferable resin which can be used in combination with an ionomer resin is a styrene block-containing thermoplastic elastomer. The styrene block-containing thermoplastic elastomer has excellent compatibility with ionomer resins. A resin composition including the styrene block-containing thermoplastic elastomer has excellent fluidity.

The styrene block-containing thermoplastic elastomer includes a polystyrene block as a hard segment, and a soft segment. A typical soft segment is a diene block. Examples of diene compounds include butadiene, isoprene, 1,3-pentadiene, and 2,3-dimethyl-1,3-butadiene. Butadiene and isoprene are preferred. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include alloys of olefin and one or more types selected from the group consisting of SBS, SIS, SIBS, SEBS, SEPS, SEEPS, and hydrogenated products thereof. The olefin component in the alloy is presumed to contribute to improvement of compatibility with ionomer resins. Use of this alloy improves the resilience performance of the golf ball 2. An olefin having 2 to 10 carbon atoms is preferably used. Examples of suitable olefins include ethylene, propylene, butene, and pentene. Ethylene and propylene are particularly preferred.

Specific examples of polymer alloys include trade names "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N", and "Rabalon SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "Septon HG-252" manufactured by Kuraray Co., Ltd.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 6 in an adequate amount.

The cover 6 has a Shore D hardness of preferably 50 or greater but 70 or less. In the golf ball 2 with the cover 6 having a Shore D hardness of 50 or greater, spin is suppressed. The golf ball 2 has excellent flight performance. In this respect, the Shore D hardness is particularly preferably equal to or greater than 55. The golf ball 2 with the cover 6 having a Shore D hardness of 70 or less provides excellent feel at impact. In this respect, the Shore D hardness is particularly preferably equal to or less than 65.

The Shore D hardness is measured according to the standards of "ASTM-D 2240-68" with an automated rubber hardness measurement machine (trade name "P1", manufactured by Kobunshi Keiki Co., Ltd.) to which a Shore D type hardness scale is mounted. For the measurement, a slab formed by hot press and having a thickness of about 2 mm is used. A slab maintained at 23° C. for two weeks is used for the measurement. At the measurement, three slabs are stacked. A slab formed from the same resin composition as the resin composition of the cover 6 is used for the measurement.

The cover 6 has a thickness of preferably 0.3 mm or greater but 3.0 mm or less. The golf ball 2 with the cover 6 having a thickness of 0.3 mm or greater has excellent durability. In this respect, the thickness is more preferably equal to or greater than 0.8 mm and particularly preferably equal to or greater than 1.0 mm. The golf ball 2 with the cover 6 having a thickness of 3.0 mm or less provides excellent feel at impact. In this respect, the thickness is more preferably equal to or less than 2.5 mm and particularly preferably equal to or less than 2.0 mm.

For forming the cover 6, known methods such as injection molding, compression molding, and the like can be used. When forming the cover 6, the dimples 8 are formed by pimples formed on the cavity face of a mold. The cover 6 may have two or more layers.

In light of feel at impact, the golf ball 2 has an amount of compressive deformation CD of preferably 2.5 mm or greater, more preferably 2.7 mm or greater, and particularly preferably 2.8 mm or greater. In light of resilience performance, the amount of compressive deformation CD is preferably equal to or less than 4.0 mm, more preferably equal to or less than 3.8 mm, and particularly preferably equal to or less than 3.6 mm.

At measurement of the amount of compressive deformation CD, first, the golf ball 2 is placed on a hard plate made of metal. Next, a cylinder made of metal gradually descends toward the golf ball 2. The golf ball 2, squeezed between the bottom face of the cylinder and the hard plate, becomes deformed. A migration distance of the cylinder, starting from the state in which an initial load of 98 N is applied to the golf ball 2 up to the state in which a final load of 1274 N is applied thereto, is measured.

EXAMPLES

The following will show the effects of the present invention by means of Examples, but the present invention should not be construed in a limited manner based on the description of these Examples.

Example 1

A rubber composition was obtained by kneading 100 parts by weight of a high-cis polybutadiene (trade name "BR-730", manufactured by JSR Corporation), 28.0 parts by weight of zinc diacrylate, 5 parts by weight of zinc oxide, 16.1 parts by weight of barium sulfate, 0.2 parts by weight of 2-naphthalenethiol, and 0.9 parts by weight of dicumyl peroxide. This rubber composition was placed into a mold including upper and lower mold halves each having a hemispherical cavity, and heated at 170° C. for 25 minutes to obtain a core with a diameter of 39.6 mm.

A resin composition was obtained by kneading 49 parts by weight of an ionomer resin (the aforementioned "Surlyn 8945"), 48 parts by weight of another ionomer resin (the aforementioned "Himilan AM7329"), and 3 parts by weight of a styrene block-containing thermoplastic elastomer (the aforementioned "Rabalon T3221C") with a twin-screw kneading extruder. The core was placed into a final mold having a large number of pimples on its cavity face. The core was covered with the resin composition by injection molding to form a cover with a thickness of 1.6 mm. Dimples having a shape that was the inverted shape of the pimples were formed on the cover. A clear paint including a two-component curing type polyurethane as a base material was applied to this cover to obtain a golf ball of Example 1 with a diameter of 42.8 mm. A hardness distribution of the core of this golf ball is shown in Table 4 and FIG. 2.

Examples 2 to 6 and Comparative Examples 1 to 6

Golf balls of Examples 2 to 6 and Comparative Examples 1 to 6 were obtained in the same manner as Example 1, except the composition and the crosslinking conditions of the core were changed. The rubber composition of the core is shown in detail in Tables 1 to 3 below.

Comparative Example 7

A rubber composition was obtained by kneading 100 parts by weight of a high-cis polybutadiene (the aforementioned "BR-730"), 22.5 parts by weight of zinc diacrylate, 5 parts by weight of zinc oxide, 18.3 parts by weight of barium sulfate, 0.5 parts by weight of diphenyl disulfide, and 0.9 parts by weight of dicumyl peroxide. This rubber composition was placed into a mold including upper and lower mold halves each having a hemispherical cavity, and heated at 170° C. for 25 minutes to obtain a center with a diameter of 25.0 mm.

A rubber composition was obtained by kneading 100 parts by weight of a high-cis polybutadiene (the aforementioned "BR-730"), 34.0 parts by weight of zinc diacrylate, 5 parts by weight of zinc oxide, 13.8 parts by weight of barium sulfate, 0.5 parts by weight of diphenyl disulfide, and 0.9 parts by weight of dicumyl peroxide. Half shells were formed from this rubber composition. The center was covered with two half shells. The center and the half shells were placed into a mold including upper and lower mold halves each having a hemispherical cavity, and heated at 170° C. for 25 minutes to obtain a core with a diameter of 39.6 mm. The core consists of the center and an envelope layer. The core was covered with a cover in the same manner as Example 1. Further, a clear paint was applied in the same manner as Example 1, to obtain a golf ball of Comparative Example 7.

[Flight Test]

A driver with a titanium head (trade name "XXIO", manufactured by SRI Sports Limited, shaft hardness: 5, loft angle: 10.0°) was attached to a swing machine manufactured by True Temper Co. A golf ball was hit under the condition of a head speed of 45 m/sec. The ball speed immediately after the hit and the distance from the launch point to the stop point were measured. The average value of data obtained by 10 measurements is shown in Tables 4 to 6 below.

[Durability Test]

A golf ball was kept in the environment of 23° C. for 12 hours. A driver with a titanium head was attached to a swing machine manufactured by True Temper Co. The golf ball was repeatedly hit under the condition of a head speed of 45 m/sec. The number of hits required to break the golf ball was counted. An index of the average value of data obtained by 12 measurements is shown in Tables 4 to 6 below.

TABLE 1

Composition of Core (parts by weight)

| | Example 1 | Example 2 | Example 3 | Example 4 | Example 5 |
|---|---|---|---|---|---|
| Polybutadiene | 100 | 100 | 100 | 100 | 100 |
| Zinc diacrylate | 28.0 | 38.0 | 26.0 | 44.0 | 25.0 |
| Zinc oxide | 5 | 5 | 5 | 5 | 5 |
| Barium sulfate | 16.1 | 12.2 | 16.8 | 9.8 | 17.3 |
| Bis(pentabromophenyl)disulfide | — | — | — | — | — |
| Diphenyl disulfide | — | — | — | — | — |
| 2-naphthalenethiol | 0.2 | 2.0 | 0.08 | 3.5 | 0.03 |
| Pentachlorothiophenol | — | — | — | — | — |
| Dicumyl peroxide | 0.9 | 0.9 | 0.9 | 0.9 | 0.9 |

TABLE 2

Composition of Core (parts by weight)

| | Comp. Example 6 | Comp. Example 1 | Comp. Example 2 | Comp. Example 3 | Comp. Example 4 |
|---|---|---|---|---|---|
| Polybutadiene | 100 | 100 | 100 | 100 | 100 |
| Zinc diacrylate | 28.0 | 29.0 | 29.5 | 31.0 | 26.5 |
| Zinc oxide | 5 | 5 | 5 | 5 | 5 |
| Barium sulfate | 16.1 | 15.7 | 14.3 | 14.9 | 15.9 |
| Bis(pentabromophenyl)disulfide | — | — | — | — | 0.5 |
| Diphenyl disulfide | — | 0.5 | — | — | — |
| 1-naphthalenethiol | 0.2 | — | — | — | — |
| 2-naphthalenethiol | — | — | 3.5 | — | — |
| Pentachlorothiophenol | — | — | — | 0.6 | — |
| Dicumyl peroxide | 0.9 | 0.9 | 0.9 | 0.9 | 0.9 |

TABLE 3

Composition of Core (parts by weight)

| | Comp. Example 5 | Comp. Example 6 | Comp. Example 7 Center | Comp. Example 7 Envelope layer |
|---|---|---|---|---|
| Polybutadiene | 100 | 100 | 100 | 100 |
| Zinc diacrylate | 40.0 | 28.0 | 22.5 | 34.0 |
| Zinc oxide | 5 | 5 | 5 | 5 |
| Barium sulfate | 10.5 | 16.1 | 18.3 | 13.8 |
| Bis(pentabromophenyl)disulfide | — | — | — | — |
| Diphenyl disulfide | — | — | 0.5 | 0.5 |
| 2-naphthalenethiol | — | — | — | — |
| Pentachlorothiophenol | — | — | — | — |
| Dicumyl peroxide | — | 1.5 | 0.9 | 0.9 |
| 1,1-di(t-butylperoxy) cyclohexane | 3.0 | — | — | — |
| 2,2'-methylenebis (4-methyl-6-t-butylphenol) | 0.1 | 0.5 | — | — |
| Zinc stearate | 5.0 | — | — | — |
| Sulfur | 0.1 | — | — | — |
| Zinc salt of pentachlorothiophenol | 0.5 | — | — | — |

The details of the compounds listed in Tables 1 to 3 are as follows.

Bis(pentabromophenyl)disulfide: Sankyo Kasei Co., Ltd.
Diphenyl disulfide: Sumitomo Seika Chemicals Co., Ltd.
1-naphthalenethiol: Alfa Aesar.
2-naphthalenethiol: Tokyo Chemical Industry Co., Ltd.
Pentachlorothiophenol: Tokyo Chemical Industry Co., Ltd.
Dicumyl peroxide: NOF Corporation.
1,1-di(t-butylperoxy)cyclohexane: trade name "Perhexa C-40", manufactured by NOF Corporation.
2,2'-methylenebis (4-methyl-6-t-butylphenol): trade name "Nocrac NS-6", manufactured by Ouchi Shinko Chemical Industrial Co., Ltd.
Zinc stearate: NOF Corporation.
Sulfur: trade name "Sulfur Z", manufactured by Tsurumi Chemical Industry Co., Ltd.

TABLE 4

Results of Evaluation

| | | Example 1 | Example 2 | Example 3 | Example 4 | Example 5 |
|---|---|---|---|---|---|---|
| Crosslinking conditions of core | Temp. (° C.) | 170 | 170 | 170 | 170 | 170 |
| | Time (min) | 25 | 25 | 25 | 25 | 25 |

TABLE 4-continued

Results of Evaluation

Figure 3:
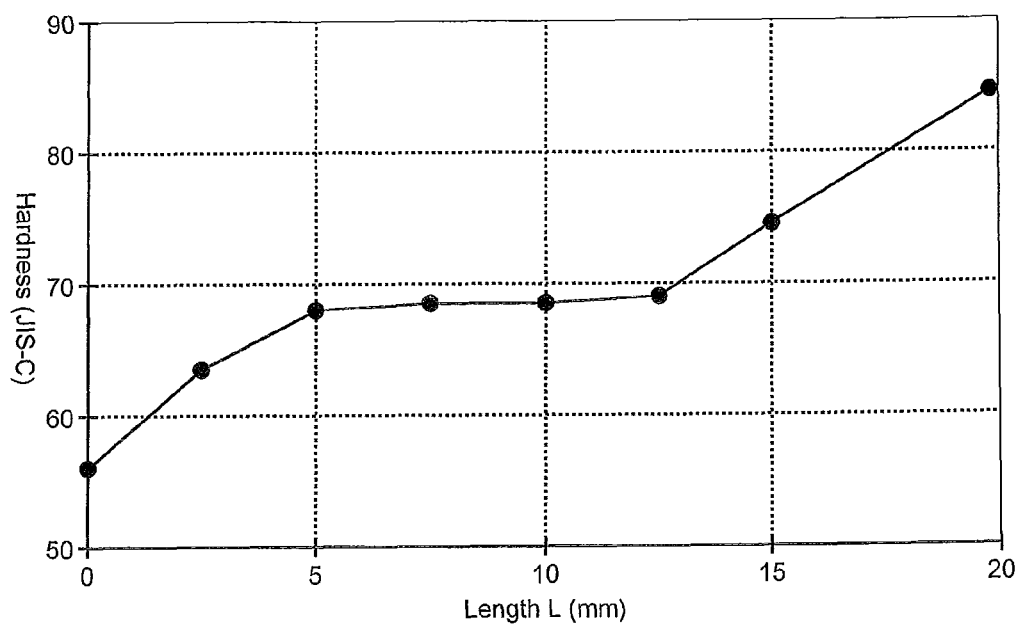
FIG. 3 is a graph showing a hardness distribution of a core of a golf ball according to Example 2.
Figure 4:
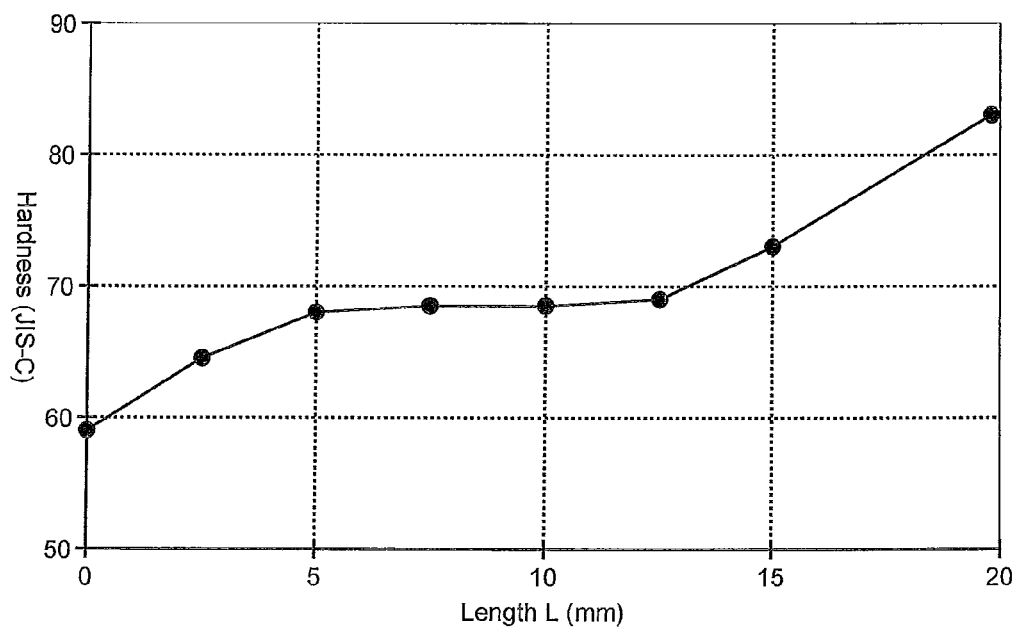
FIG. 4 is a graph showing a hardness distribution of a core of a golf ball according to Example 3.
Figure 5:
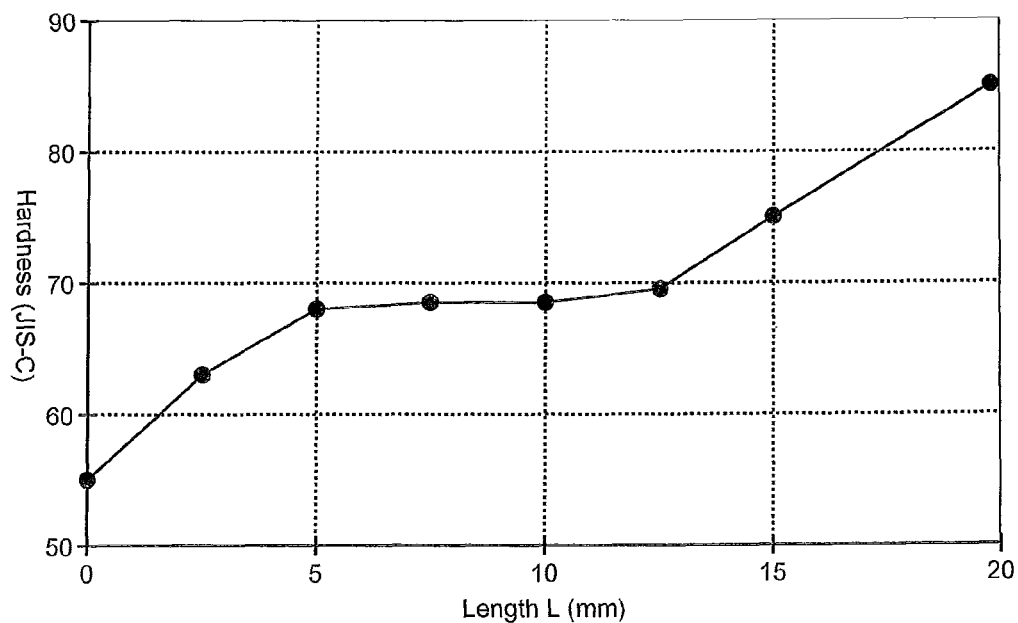
FIG. 5 is a graph showing a hardness distribution of a core of a golf ball according to Example 4.
Figure 6:
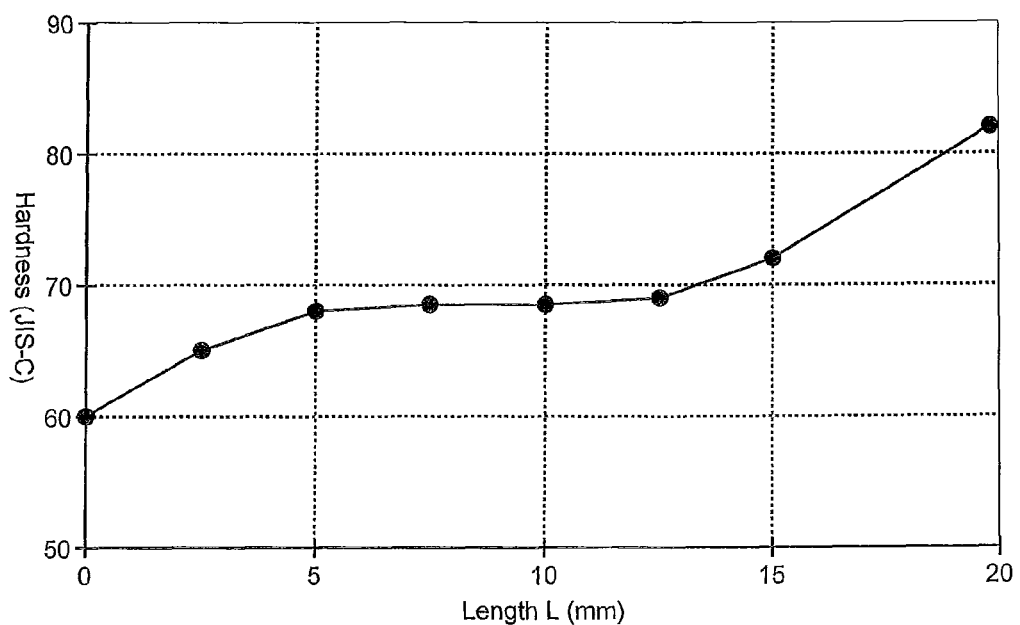
FIG. 6 is a graph showing a hardness distribution of a core of a golf ball according to Example 5.

|  |  | Example 1 | Example 2 | Example 3 | Example 4 | Example 5 |
|---|---|---|---|---|---|---|
| Core diameter (mm) |  | 39.6 | 39.6 | 39.6 | 39.6 | 39.6 |
| Hardness | Ho | 57.0 | 56.0 | 59.0 | 55.0 | 60.0 |
| of core | H(2.5) | 64.0 | 63.5 | 64.5 | 63.0 | 65.0 |
| (JIS-C) | H(5.0) | 68.0 | 68.0 | 68.0 | 68.0 | 68.0 |
|  | H(7.5) | 68.5 | 68.5 | 68.5 | 68.5 | 68.5 |
|  | H(10.0) | 68.5 | 68.5 | 68.5 | 68.5 | 68.5 |
|  | H(12.5) | 69.0 | 69.0 | 69.0 | 69.5 | 69.0 |
|  | H(12.6) | — | — | — | — | — |
|  | H(15.0) | 74.0 | 74.5 | 73.0 | 75.0 | 72.0 |
|  | Hs | 84.0 | 84.5 | 83.0 | 85.0 | 82.0 |
|  | Graph | FIG. 2 | FIG. 3 | FIG. 4 | FIG. 5 | FIG. 6 |
| H(5.0) − Ho |  | 11.0 | 12.0 | 9.0 | 13.0 | 8.0 |
| H(12.5) − H(5.0) |  | 1.0 | 1.0 | 1.0 | 1.5 | 1.0 |
| Hs − H(12.5) |  | 15.0 | 15.5 | 14.0 | 15.5 | 13.0 |
| Hs − Ho |  | 27.0 | 28.5 | 24.0 | 30.0 | 22.0 |
| Amount of compressive deformation CD (mm) |  | 3.2 | 3.2 | 3.2 | 3.2 | 3.2 |
| Ball speed (m/s) |  | 64.8 | 64.6 | 64.7 | 64.5 | 64.7 |
| Flight distance (m) |  | 233 | 232 | 231 | 231 | 230 |
| Durability |  | 98 | 97 | 99 | 95 | 99 |

TABLE 5

Results of Evaluation

Figure 7:
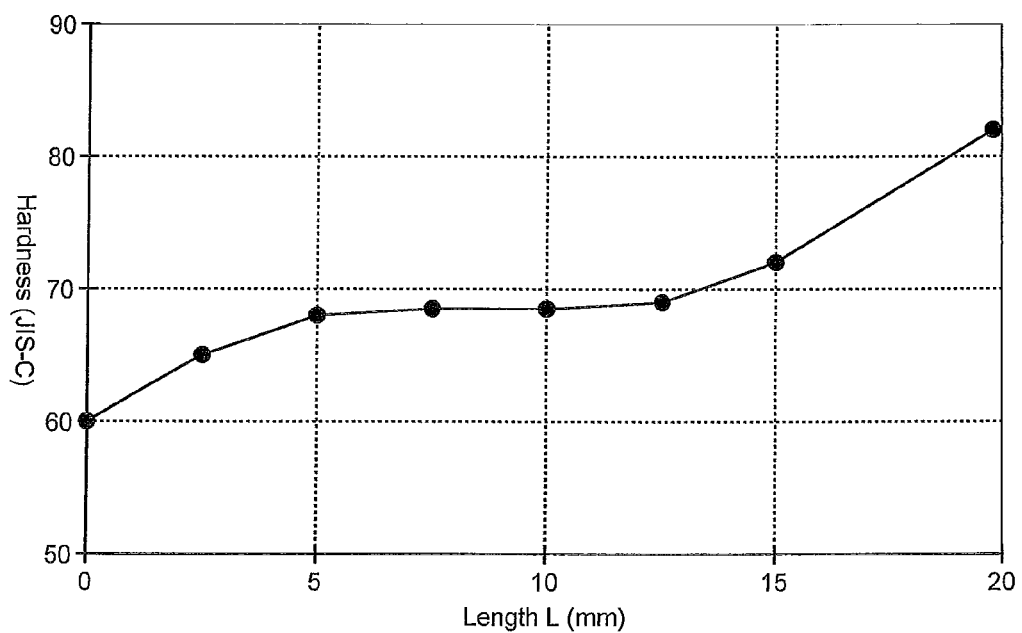
FIG. 7 is a graph showing a hardness distribution of a core of a golf ball according to Example 6.
Figure 8:
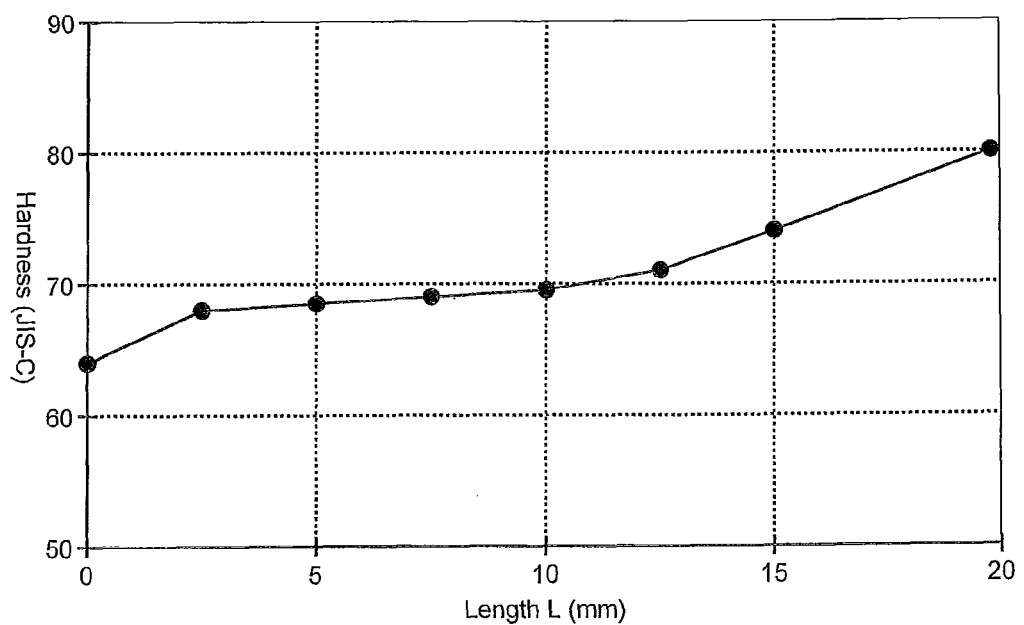
FIG. 8 is a graph showing a hardness distribution of a core of a golf ball according to Comparative Example 1.
Figure 9:
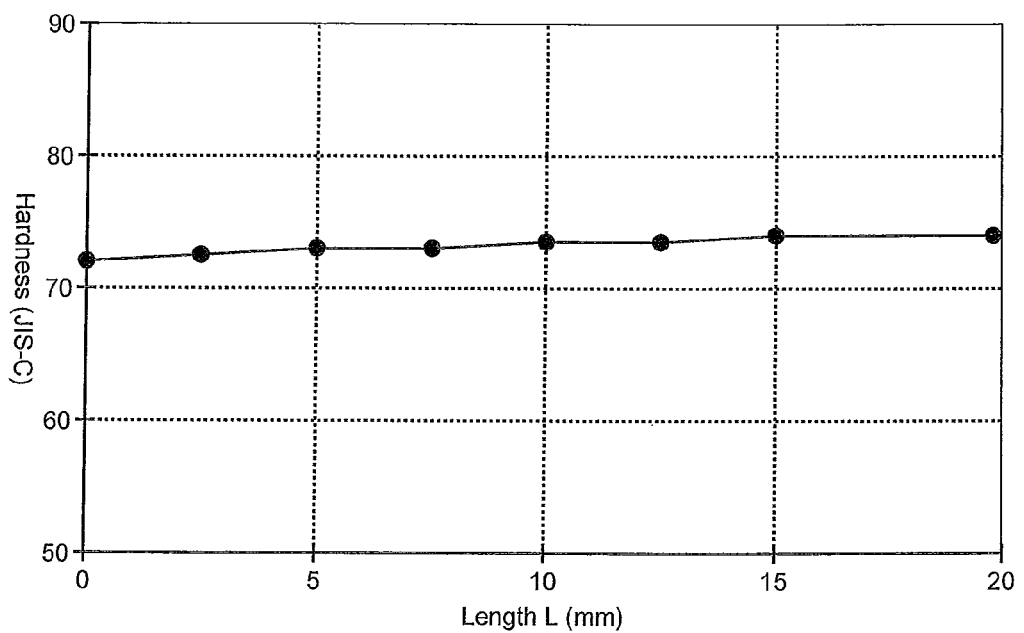
FIG. 9 is a graph showing a hardness distribution of a core of a golf ball according to Comparative Example 2.
Figure 10:
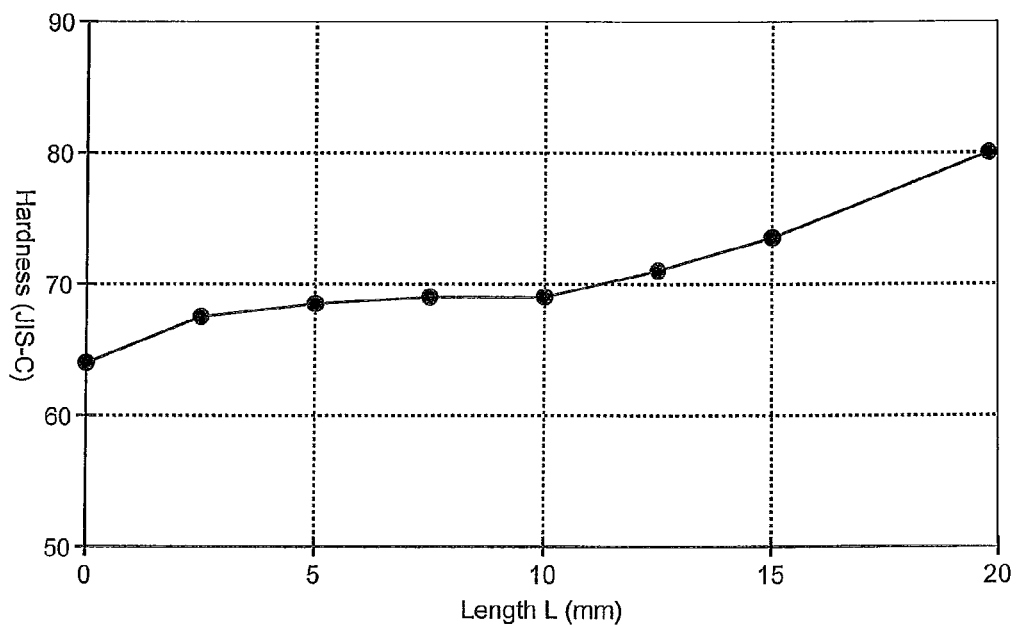
FIG. 10 is a graph showing a hardness distribution of a core of a golf ball according to Comparative Example 3.
Figure 11:
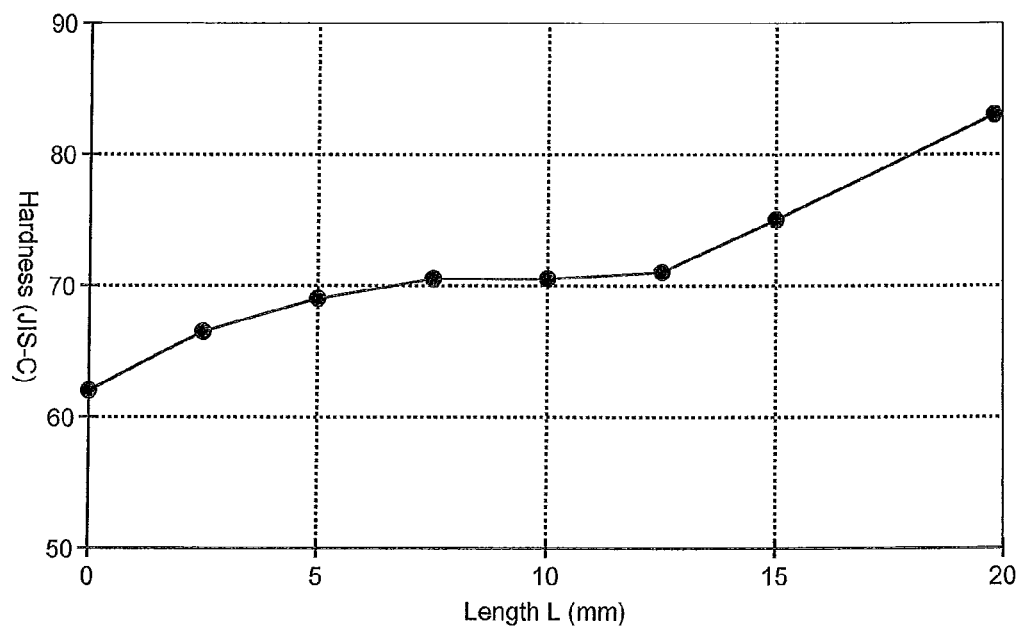
FIG. 11 is a graph showing a hardness distribution of a core of a golf ball according to Comparative Example 4.

|  |  | Example 6 | Comp. Example 1 | Comp. Example 2 | Comp. Example 3 | Comp. Example 4 |
|---|---|---|---|---|---|---|
| Crosslinking conditions of core | Temp. (° C.) | 170 | 170 | 155 | 170 | 170 |
|  | Time (min) | 25 | 25 | 40 | 25 | 25 |
| Core diameter (mm) |  | 39.6 | 39.6 | 39.6 | 39.6 | 39.6 |
| Hardness | Ho | 60.0 | 64.0 | 72.0 | 64.0 | 62.0 |
| of core | H(2.5) | 65.0 | 68.0 | 72.5 | 67.5 | 66.5 |
| (JIS-C) | H(5.0) | 68.0 | 68.5 | 73.0 | 68.5 | 69.0 |
|  | H(7.5) | 68.5 | 69.0 | 73.0 | 69.0 | 70.5 |
|  | H(10.0) | 68.5 | 69.5 | 73.5 | 69.0 | 70.5 |
|  | H(12.5) | 69.0 | 71.0 | 73.5 | 71.0 | 71.0 |
|  | H(12.6) | — | — | — | — | — |
|  | H(15.0) | 72.0 | 74.0 | 74.0 | 73.5 | 75.0 |
|  | Hs | 82.0 | 80.0 | 74.0 | 80.0 | 83.0 |
|  | Graph | FIG. 7 | FIG. 8 | FIG. 9 | FIG. 10 | FIG. 11 |
| H(5.0) − Ho |  | 8.0 | 4.5 | 1.0 | 4.5 | 7.0 |
| H(12.5) − H(5.0) |  | 1.0 | 2.5 | 0.5 | 2.5 | 2.0 |
| Hs − H(12.5) |  | 13.0 | 9.0 | 0.5 | 9.0 | 12.0 |
| Hs − Ho |  | 22.0 | 16.0 | 2.0 | 16.0 | 21.0 |
| Amount of compressive deformation CD (mm) |  | 3.2 | 3.2 | 3.2 | 3.2 | 3.2 |
| Ball speed (m/s) |  | 64.7 | 64.5 | 65.0 | 64.5 | 64.8 |
| Flight distance (m) |  | 230 | 225 | 223 | 224 | 228 |
| Durability |  | 99 | 100 | 120 | 100 | 100 |

TABLE 6

Results of Evaluation

|  |  | Comp. Example 5 | Comp. Example 6 | Comp. Example 7 Center | Comp. Example 7 Envelope layer |
|---|---|---|---|---|---|
| Crosslinking conditions of core | Temp. (° C.) | 160 | 162 | 170 | 170 |
|  | Time (min) | 25 | 23 | 25 | 25 |
| Core diameter (mm) |  | 39.6 | 39.6 | 39.6 |  |
| Hardness of core (JIS-C) | Ho | 57.0 | 65.0 | 54.0 |  |
|  | H(2.5) | 63.0 | 69.0 | 58.0 |  |
|  | H(5.0) | 68.0 | 72.0 | 59.0 |  |
|  | H(7.5) | 68.5 | 72.0 | 61.0 |  |
|  | H(10.0) | 69.0 | 72.0 | 65.0 |  |
|  | H(12.5) | 67.0 | 75.0 | 69.0 |  |

TABLE 6-continued

Results of Evaluation

Figure 12:
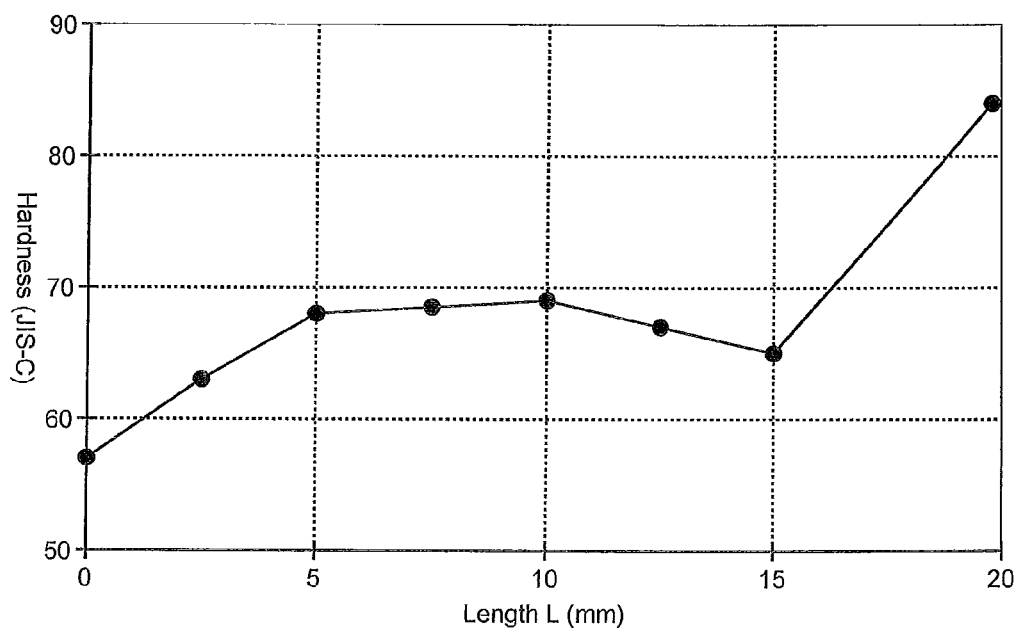
FIG. 12 is a graph showing a hardness distribution of a core of a golf ball according to Comparative Example 5.
Figure 13:
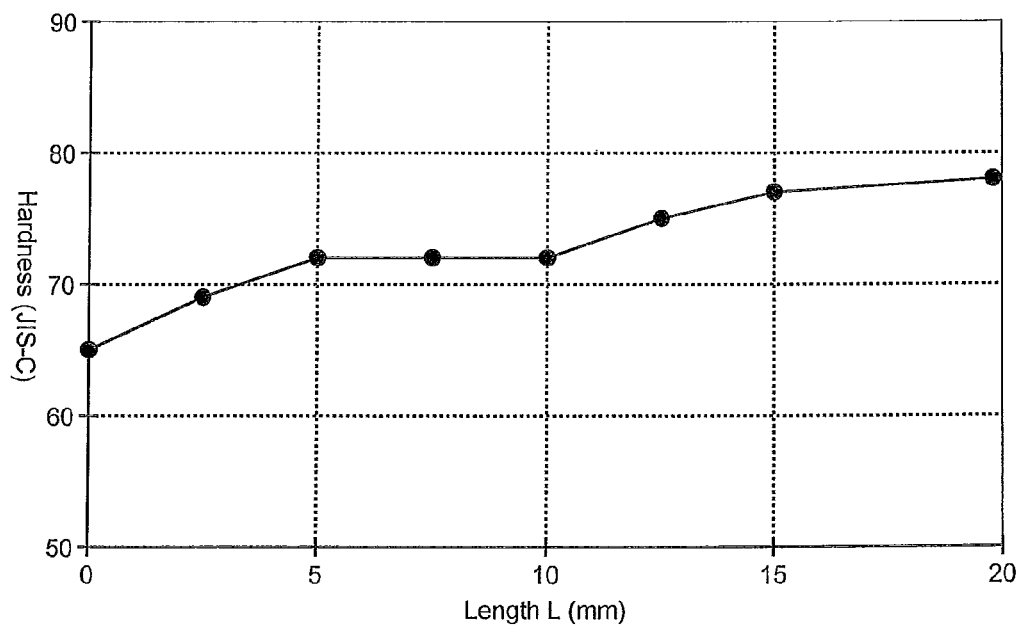
FIG. 13 is a graph showing a hardness distribution of a core of a golf ball according to Comparative Example 6.
Figure 14:
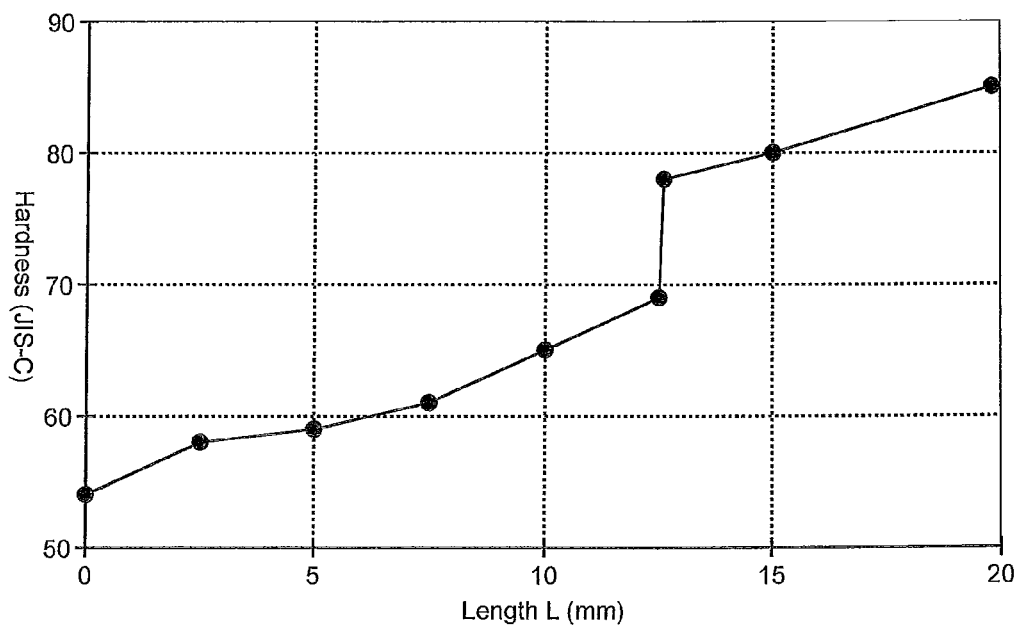
FIG. 14 is a graph showing a hardness distribution of a core of a golf ball according to Comparative Example 7.

| | | Comp. Example 5 | Comp. Example 6 | Comp. Example 7 Center | Comp. Example 7 Envelope layer |
|---|---|---|---|---|---|
| | H(12.6) | — | — | | 78.0 |
| | H(15.0) | 65.0 | 77.0 | 80.0 | |
| | Hs | 84.0 | 78.0 | 85.0 | |
| | Graph | FIG. 12 | FIG. 13 | FIG. 14 | |
| H(5.0)-Ho | | 11.0 | 7.0 | 5.0 | |
| H(12.5)-H(5.0) | | −1.0 | 3.0 | 10.0 | |
| Hs-H(12.5) | | 17.0 | 3.0 | 16.0 | |
| Hs-Ho | | 27.0 | 13.0 | 31.0 | |
| Amount of compressive deformation CD (mm) | | 3.2 | 3.2 | 3.2 | |
| Ball speed (m/s) | | 64.0 | 64.0 | 64.3 | |
| Flight distance (m) | | 220 | 219 | 230 | |
| Durability | | 95 | 105 | 60 | |

As shown in Tables 4 to 6, the golf balls according to Examples are excellent in various performance characteristics. From the results of evaluation, advantages of the present invention are clear.

The golf ball according to the present invention can be used for playing golf on a golf course and practicing at a driving range. This is merely one example.

The above description is merely for illustrative examples, and various modifications can be made without departing from the principles of the present invention.

What is claimed is:

1. A golf ball comprising a core and a cover positioned outside the core, wherein
    a difference between: a JIS-C hardness H(5.0) at a point which is located at a distance of 5 mm from a central point of the core; and a JIS-C hardness Ho at the central point is equal to or greater than 6.0,
    a difference between: a JIS-C hardness H(12.5) at a point which is located at a distance of 12.5 mm from the central point; and the hardness H(5.0) is equal to or less than 3.0,
    a difference between a JIS-C hardness Hs at a surface of the core and the hardness H(12.5) is equal to or greater than 10.0,
    a difference between the hardness Hs and the hardness Ho is equal to or greater than 22.0,
    there is no zone in which a hardness decreases from the central point toward the surface,
    the core is formed by crosslinking a rubber composition including a base rubber and an organic sulfur compound, and the organic sulfur compound is 2-naphthalenethiol,
    the rubber composition includes the base rubber in an amount of 100 parts by weight, and 2-naphthalenethiol in an amount which is not less than 0.2 parts by weight and not greater than 2.0 parts by weight, and
    the JIS-C hardness Ho at the central point of the core is equal to or less than 60.0.

2. The golf ball according to claim 1, wherein
    the hardness Ho is equal to or greater than 40.0, and
    the hardness Hs is equal to or greater than 78.0 but equal to or less than 95.0.

3. The golf ball according to claim 1, wherein the hardness H(5.0) is equal to or greater than 63.0 but equal to or less than 73.0.

4. The golf ball according to claim 1, wherein the hardness H(12.5) is equal to or greater than 64.0 but equal to or less than 76.0.

5. The golf ball according to claim 1, wherein an amount of compressive deformation CD of the golf ball is equal to or greater than 2.5 mm but equal to or less than 4.0 mm.

6. The golf ball according to claim 1, wherein the JIC-C hardness H(12.5) is not less than 64.0 and not greater than 72.0.

7. The golf ball according to claim 1, wherein a difference between: the JIS-C hardness H(12.5) and a JIS-C hardness H(10.0) at a point which is located at a distance of 10 mm from a central point of the core, is equal to or less than 1.0.

8. The golf ball according to claim 1, wherein a JIS-C hardness H(15.0) at a point which is located at a distance of 15 mm from a central point of the core, is greater than a JIS-C hardness H(10.0) at a point which is located at a distance of 10 mm from a central point of the core.

* * * * *